(12) United States Patent
Kimura et al.

(10) Patent No.: US 10,464,447 B2
(45) Date of Patent: Nov. 5, 2019

(54) SLIDE RAIL DEVICE FOR VEHICLE

(71) Applicant: SHIROKI CORPORATION, Fujisawa-shi, Kanagawa (JP)

(72) Inventors: Akihiro Kimura, Toyokawa (JP); Naoki Hayashi, Toyokawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 116 days.

(21) Appl. No.: 15/640,813

(22) Filed: Jul. 3, 2017

(65) Prior Publication Data
US 2018/0009337 A1  Jan. 11, 2018

(30) Foreign Application Priority Data

Jul. 6, 2016  (JP) ................. 2016-134095

(51) Int. Cl.
*B60N 2/07* (2006.01)
*B60N 2/08* (2006.01)

(52) U.S. Cl.
CPC ......... *B60N 2/0727* (2013.01); *B60N 2/0705* (2013.01); *B60N 2/0715* (2013.01); *B60N 2/08* (2013.01); *B60N 2/0818* (2013.01); *B60N 2/0875* (2013.01); *B60N 2205/20* (2013.01)

(58) Field of Classification Search
CPC .. B60N 2/0727; B60N 2/0705; B60N 2/0715; B60N 2/08; B60N 2/0818; B60N 2/0875; B60N 2/07; B60N 2/0722
See application file for complete search history.

(56) References Cited

U.S. PATENT DOCUMENTS

| | | | |
|---|---|---|---|
| 8,936,227 B2 * | 1/2015 | Kawamura | B60N 2/08 248/429 |
| 9,004,437 B2 * | 4/2015 | Yamada | B60N 2/682 248/429 |
| 9,016,655 B2 * | 4/2015 | Aoi | B60N 2/0705 248/430 |
| 9,038,981 B2 * | 5/2015 | Hoshihara | B60N 2/06 248/429 |
| 9,145,070 B2 * | 9/2015 | Hayashi | B60N 2/0705 |
| 9,238,422 B2 * | 1/2016 | Yamada | B60N 2/07 |
| 9,327,615 B2 * | 5/2016 | Yamada | B60N 2/0705 |
| 9,327,616 B2 * | 5/2016 | Hoshihara | B60N 2/0856 |
| 9,463,716 B2 * | 10/2016 | Hayashi | B60N 2/08 |
| 9,469,217 B2 * | 10/2016 | Hayashi | B60N 2/0705 |
| 9,616,777 B2 * | 4/2017 | Arakawa | B60N 2/0705 |
| 10,086,721 B2 * | 10/2018 | Arakawa | B60N 2/0705 |
| 2011/0163217 A1 * | 7/2011 | Kimura | B60N 2/0705 248/429 |
| 2013/0206950 A1 * | 8/2013 | Hayashi | B60N 2/0705 248/429 |

(Continued)

FOREIGN PATENT DOCUMENTS

JP  2010-173575 A  8/2010

*Primary Examiner* — Nkeisha Smith
(74) *Attorney, Agent, or Firm* — Buchanan Ingersoll & Rooney PC (57) ABSTRACT

In a slide rail device for use in a vehicle, a lock control member comprises a pair of facing walls which face a pair of side walls of an upper rail and extend in upward and downward direction, and a pair of anti-rattle projections which project from the pair of facing walls toward the pair of side walls of the upper rail.

4 Claims, 4 Drawing Sheets

(56) References Cited

U.S. PATENT DOCUMENTS

| | | | |
|---|---|---|---|
| 2014/0239141 A1* | 8/2014 | Yamada | B60N 2/08 248/430 |
| 2015/0090853 A1* | 4/2015 | Arakawa | B60N 2/0705 248/429 |
| 2015/0306979 A1* | 10/2015 | Hayashi | B60N 2/085 248/429 |
| 2017/0341535 A1* | 11/2017 | Taniguchi | B60N 2/0881 |
| 2018/0141466 A1* | 5/2018 | Goto | B60N 2/0155 |
| 2018/0257515 A1* | 9/2018 | Taniguchi | B60N 2/0818 |

* cited by examiner

SLIDE RAIL DEVICE FOR VEHICLE

BACKGROUND OF THE INVENTION

1. Field of the Invention

The present invention relates to a slide rail device for use in a vehicle, more specifically for use with a vehicle seat.

2. Description of Related Art

The basic configuration of a typical slide rail device (slide rail assembly/seat base slider) for use in a vehicle (motor vehicle) is configured of a lower rail which is mounted to a vehicle floor and extends in the forward and rearward directions, an upper rail which is mounted to a vehicle sheet and extends in the forward and rearward directions and a lock mechanism which allows or prevents the upper rail from sliding in the forward and rearward directions relative to the lower rail.

The upper rail includes a base having a substantially inverted U-shaped cross section, and the lock mechanism includes a lock control member (e.g., a lock release lever or a loop handle) which is operated to change the position thereof in the upward and downward directions in a state of being accommodated in the base (having a substantially inverted U-shaped cross section) of the upper rail (e.g., to rotate (swing) in the upward and downward directions). A slide rail device having such an upper rail and such a lock control member is disclosed in Japanese Unexamined Patent Publication No. 2010-173575.

However, in conventional slide rail devices for vehicle, when the lock control member changes the position thereof in the upward and downward directions (e.g., when the lock control member rotates (swings) in the upward and downward directions) inside the upper rail, there is a possibility of the lock control member rattling relative to the upper rail in the widthwise direction and thereby inducing problems such as malfunctioning and noise generation.

SUMMARY OF THE INVENTION

The prevent invention has been made based on the awareness of the above-described problems and provides a slide rail device for use in a vehicle which makes it possible to prevent the lock control member from rattling relative to the upper rail in the widthwise direction and prevent problems such as malfunctioning and noise generation which may be caused by the rattling of the lock control member from occurring.

According to an aspect of the prevent invention, a slide rail device for use in a vehicle is provided, including: a lower rail which is mounted to a vehicle floor and extends in the forward and rearward directions; an upper rail which is mounted to a vehicle seat and extends in the forward and rearward directions; and a lock mechanism which locks the upper rail to prevent the upper rail from moving in the forward and rearward directions relative to the lower rail and unlocks the upper rail to allow the upper rail to move in the forward and rearward directions relative to the lower rail. The upper rail includes a pair of side walls which are spaced from each other in the widthwise direction and extend in the upward and downward directions. The lock mechanism includes a lock control member which is operated to change a position thereof in the upward and downward directions in a state of being accommodated in between the pair of side walls of the upper rail. The lock control member includes: a pair of facing walls which face the pair of side walls of the upper rail and extend in the upward and downward direction; and a pair of anti-rattle projections which project from the pair of facing walls toward the pair of side walls of the upper rail.

The pair of anti-rattle projections can be formed to project from the upper ends of the pair of facing walls.

The pair of anti-rattle projections can include: a pair of inclined lugs which extend obliquely upward in directions away from each other from the upper ends of the pair of facing walls toward the pair of side walls of the upper rail; and a pair of anti-rattle lugs which extend upward from ends of the pair of inclined lugs along inner surfaces of the pair of side walls of the upper rail.

The pair of anti-rattle lugs can be provided at the upper ends thereof with a pair of chamfered portions which are formed to face inner surfaces of the pair of side walls of the upper rail.

The lock mechanism can be composed of: a plurality of lock grooves which are formed on the lower rail and arranged in the forward and rearward directions; a lock spring support portion which is formed on the upper rail; and a lock spring. The lock spring includes: a lock portion capable of being engaged with and disengaged from the lock grooves; and a supported portion which is supported by the lock spring support portion, wherein the lock spring is biased in a direction to bring the lock portion into engagement with the lock grooves and is configured to be capable of bringing the lock portion into engagement with and disengagement from the lock grooves by moving the lock portion in upward and downward directions with the supported portion as a support point, wherein the lock control member of the lock mechanism includes a lock release lever which is supported by the upper rail and capable of rotating between a locked position at which the lock release lever allows the lock portion of the lock spring to be engaged with the lock grooves and an unlocked position at which the lock release lever presses the lock spring in a direction to disengage the lock portion from the lock grooves.

According to an embodiment of the present invention, a slide rail device for use in a vehicle which makes it possible to prevent the lock control member from rattling relative to the upper rail in the widthwise direction and prevent problems such as malfunctioning and noise generation which may be caused by the rattling of the lock control member from occurring is achieved.

The present disclosure relates to subject matter contained in Japanese Patent Application No. 2016-134095 (filed on Jul. 6, 2016) which is expressly incorporated herein by reference in its entirety.

BRIEF DESCRIPTION OF THE DRAWINGS

The present invention will be discussed below in detail with reference to the accompanying drawings, in which.

DESCRIPTION OF THE EMBODIMENT

An embodiment of a slide rail device 10 according to the present invention, which is designed for use with a vehicle seat, will be hereinafter discussed with reference to FIGS. 1 through 7. Note that the directions described in the following description are defined based on the directions of arrows shown in the drawings.

Figure 1:
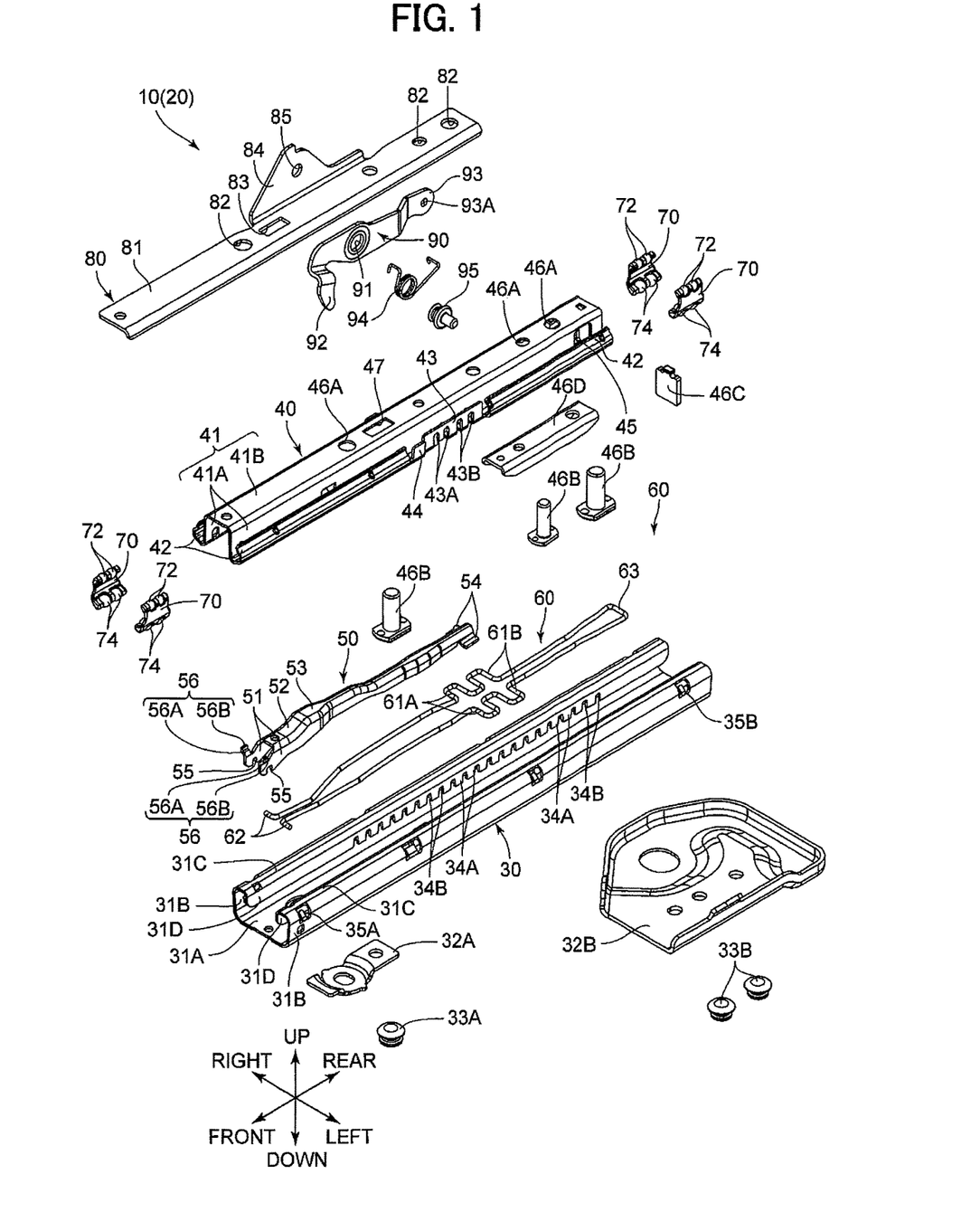
FIG. 1 is an exploded perspective view of an embodiment of a slide rail device (one of a pair of rail units) for use in a vehicle, according to the present invention, viewed obliquely from above.

The slide rail device 10 is provided with a pair of left and right rail units 20 (only one of the left and right rail units 20 is shown in FIG. 1). A vehicle seat (not shown) is supported by the pair of left and right rail units 20. The pair of left and right rail units 20 basically have a common shape (are basically bilaterally symmetrical in shape), so that only one of the pair of rail units 20 will be discussed hereinafter.

The rail unit 20 (the slide rail device 10) is provided with a lower rail 30 which is fixed onto a vehicle floor. The lower rail 30 is a metal channel member which is open at the top and extends in the forward and rearward directions. The lower rail 30 is provided with a bottom wall 31A, a pair of outer walls 31B, a pair of top walls 31C and a pair of inner walls 31D. The bottom wall 31A is formed into a substantially-horizontal plate, the pair of outer walls 31B extend upward from either side of the bottom wall 31A in the leftward and rightward directions (widthwise direction), the pair of top walls 31C bend inwardly from the pair of outer walls 31B, and the pair of inner walls 31D bend downward from the pair of top walls 31C to extend toward the bottom wall 31A. The rail unit 20 is provided with a front bracket 32A and a rear bracket 32B which are fixed to the vehicle floor, and the bottom wall 31A of the lower rail 30 is fixed to the front bracket 32A and the rear bracket 32B via a front rivet 33A and rear rivets 33B. With this structure, the lower rail 30 is fixedly mounted to the vehicle floor.

Lower edge portions of the pair of inner walls 31D of the lower rail 30 are each provided with a large number of lock teeth 34A which are arranged at equal intervals in the forward and rearward directions, and lock grooves (elements of a lock mechanism) 34B which are open at the lower ends thereof are formed between the adjacent lock teeth 34A. The lower rail 30 is provided, on the connecting portion (boundary portion) between each outer wall 31B and the associated top wall 31C, with a front-end stopper (lanced lug) 35A and a rear-end stopper (lanced lug) 35B which are positioned in the vicinity of the front and rear ends of the lower rail 30, respectively, and which are formed by cutting and raising (lancing) portions of the aforementioned connecting portion.

The rail unit 20 (the slide rail device 10) is provided with an upper rail 40 which is mounted to a vehicle seat (which includes a seat back and seat cushion). The upper rail 40 is supported to be slidable in the forward and rearward directions with respect to the lower rail 30. The upper rail 40 is formed of a metal channel member which extends in the forward and rearward directions and is open at the bottom. The upper rail 40 is provided with a base 41 which has a substantially inverted U-shaped cross section. Specifically, the base 41 consists of a pair of left and right side walls 41A which are spaced from each other in the leftward and rightward directions (widthwise direction) and extend in the upward and downward directions and a horizontal top wall 41B which connects the upper ends of the left and right side walls 41A. The upper rail 40 is further provided with a pair of upright walls 42, a pair of lock walls 43 and a pair of stopper walls 44. The upright walls 42 extend upward from lower end portions of the left and right side walls 41A which exclude central portions thereof in the longitudinal direction of the upper rail 40, the lock walls 43 extend upward from the aforementioned center portions of the lower ends of the left and right side walls 41A, and the stopper walls 44 are formed at positions immediately in front of the lock walls 43 (each stopper wall 44 is formed at a position between the adjacent lock wall 43 and a front half of the adjacent upright wall 42 in the longitudinal direction of the upper rail 40).

A total of four forward-rearward movement restriction grooves: two forward-rearward movement restriction grooves 43A and two forward-rearward movement restriction grooves 43B are formed over the lower edge of each lock wall 43 and the lower edge of the associated side wall 41A of the base 41 to extend upward. The upper rail 40 is provided at rear portions of the left and right side walls 41A of the base 41 with a pair of rear lock-engaging lugs (elements of the lock mechanism/lock spring support portions) 45 which extend inward and subsequently upward. The pair of rear lock-engaging lugs (lanced lugs) 45 are formed by cutting and raising (lancing) portions of the left and right side walls 41A. Each rear lock-engaging lug 56 is provided at the upper end thereof with a downwardly-recessed spring support groove (not shown). The upper rail 40 is provided, at portions of the left and right side walls 41A of the base 41 in front of central portions thereof, with a pair of front lock-engaging lugs (lanced lugs) (not shown) which are projected inward and formed by cutting and raising (lancing) portions of the left and right side walls 41A.

Three bolt insertion holes (through-holes) 46A are formed in the top wall 41B of the base 41 of the upper rail 40 to be aligned in the forward and rearward directions. Three fixing bolts 46B are inserted into the three bolt insertion holes 46A from below. The upper rail 40 is fixedly mounted to a vehicle seat by fastening the three fixing bolts 46B to a component (not shown) on the vehicle seat side. The upper rail 40 is provided, on the rear end of the inner surface of the base 41, with a rear-end cover member 46C which prevents the left and right side walls 41A of the base 41 from being deformed inwardly (in directions toward each other). A metal-made inner reinforcement 46D for improving rigidity of the upper rail 40 is fixed to the inner surface of the base 41 at a position in front of the rear-end cover member 46C. A lock-lug insertion hole (through-hole) 47 in the shape of a substantially rectangle which is short in the leftward and rightward directions and long in the forward and rearward directions is formed in the top wall 41B of the base 41 at a position a little in front of the central portion of the top wall 41B in the forward and rearward directions.

Figure 2:
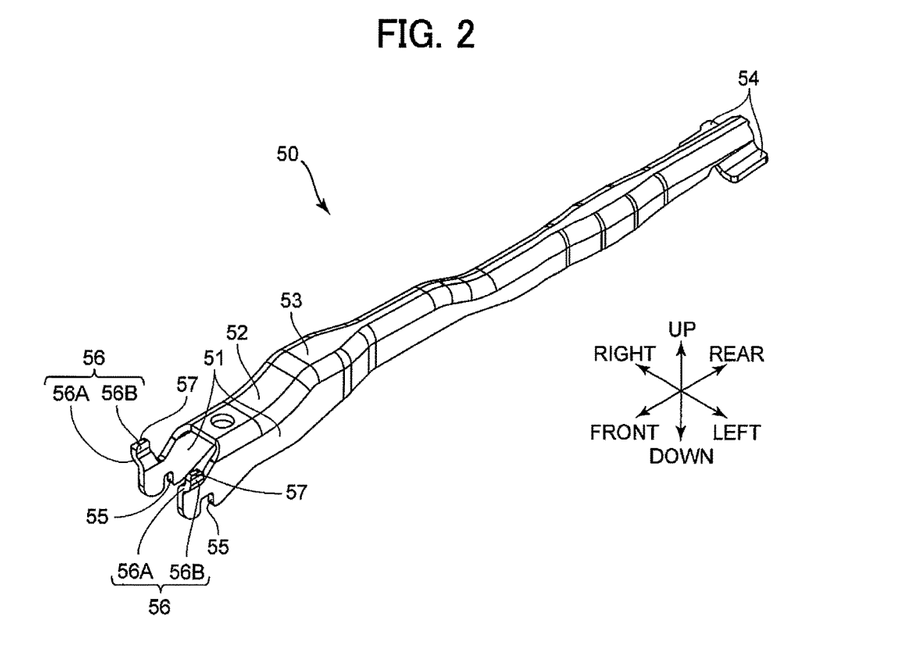
FIG. 2 is a perspective view of a lock release lever (lock control member), showing the structure of the lock release lever alone.
Figure 3:
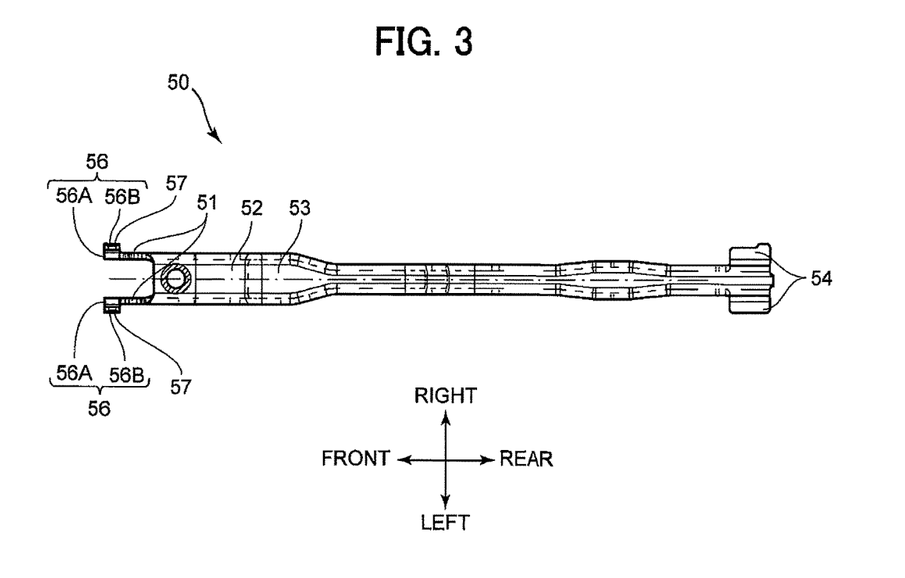
FIG. 3 is a plan view of the lock release lever, showing the structure of the lock release lever alone.
Figure 4:
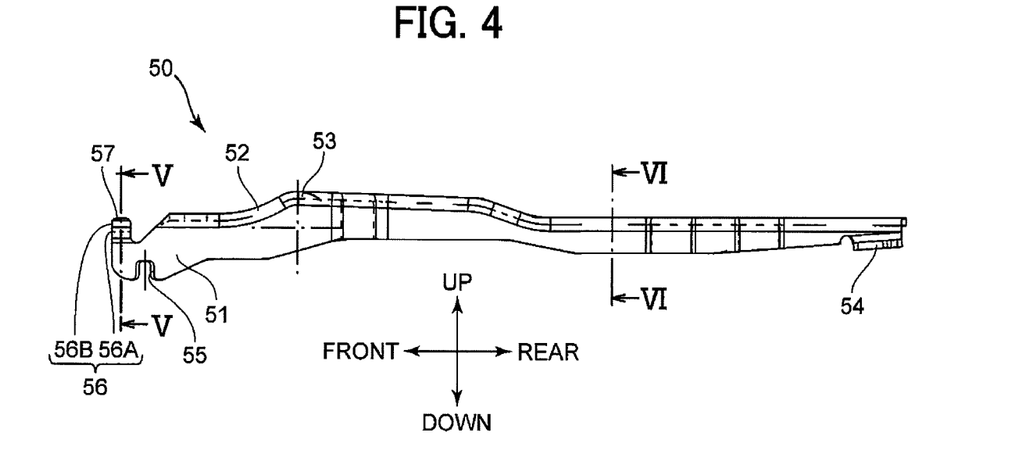
FIG. 4 is a side elevational view of the lock release lever, showing the structure of the lock release lever alone.
Figure 5:
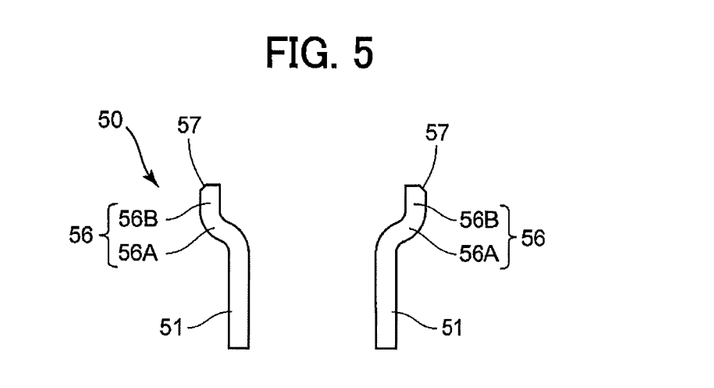
FIG. 5 is a sectional view taken along the line V-V shown in FIG. 4.
Figure 6:
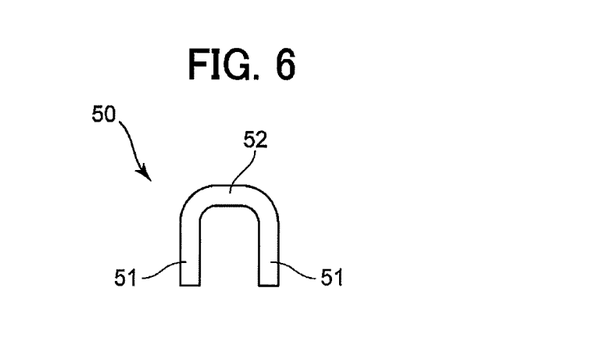
FIG. 6 is a sectional view taken along the line VI-VI shown in FIG. 4.
Figure 7:
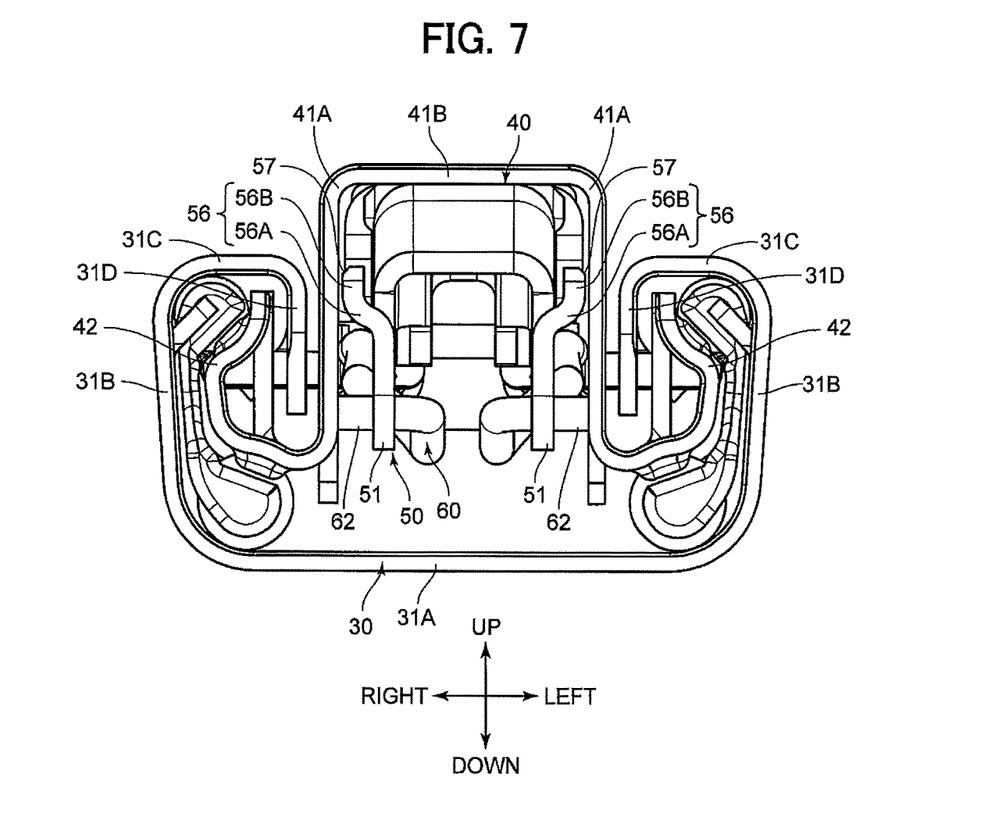
FIG. 7 is a front elevational view of a lower rail, an upper rail, the lock release lever and a lock spring that are elements of the slide rail device shown in FIG. 1, for illustrating an assembled state of these elements.

The rail unit 20 is provided with a lock release lever (an element of the lock mechanism/lock control member) 50 which is installed to the upper rail 40. The lock release lever 50 is a press-molded metal channel member, formed from a metal plate, which extends in the forward and rearward directions and is open at the bottom. The lock release lever 50 has a substantially inverted U-shaped cross section and is provided with a pair of left and right side walls (facing walls) 51 and an upper wall 52. The pair of left and right side walls (facing walls) 51 are spaced from each other in the leftward and rightward directions (widthwise direction) and extend in the upward and downward directions, and the upper wall 52 connects the upper ends of the left and right side walls (facing walls) 51. A portion of the lock release lever 50 in the vicinity of the front end thereof consists solely of front end portions of the left and right side walls (facing walls) 51; in other words, the upper wall 52 does not cover the front end of the lock release lever 50. The lock release lever 50 is provided on top thereof with a rotational contact protrusion 53 which is widened in the leftward and rightward directions and protrudes upward. The lock release lever 50 is provided at the rear end thereof with a pair of left and right spring pressing lugs 54. The pair of left and right spring pressing lugs 54 are shaped like flat plates that are formed by laterally outwardly bending lower ends of the pair of left and right side walls 51. Upwardly-recessed spring-hook grooves 55 are formed in the lower edges of front portions (portions of the left and right side walls 51 which are positioned forward from the rotational contact protrusion 53) of the left and right side walls 51, respectively.

The lock release lever 50 is accommodated inside the base 41 of the upper rail 40 (in between the pair of side walls 41A). In this accommodated state, the pair of side walls (facing walls) 51 of the lock release lever 50 face the pair of side walls 41A of the upper rail 40 in the outward directions from inside in the widthwise direction.

As shown in FIGS. 1 through 7, the lock release lever 50 is provided with a pair of left and right anti-rattle projections 56 which project from the pair of side walls (facing walls) 51 toward the pair of side walls 41A of the upper rail 40, respectively. More specifically, the pair of anti-rattle projections 56 consist of a pair of left and right inclined lugs 56A which extend obliquely upward and outward in directions away from each other from the upper front ends of the left and right side walls (facing walls) 51 and a pair of anti-rattle lugs 56B which extend upward from the upper ends of the pair of left and right inclined lugs 56A along the inner surfaces of the left and right side walls 41A of the base 41.

As shown in FIGS. 2 through 5 and 7, the pair of anti-rattle lugs 56B are provided at the outer edges of the upper ends thereof with a pair of chamfered portions (inclined surface) 57 which face inner surfaces of the pair of side walls 41A of the upper rail 40, respectively. Each anti-rattle lug 56B (the chamfered portion 57 thereof) and the adjacent side wall 41A of the upper rail 40 face each other with a minimum clearance (minute clearance) therebetween, and lubricating grease (not shown) is applied in between these mutually facing surfaces.

The rail unit 20 is provided with a lock spring (an element of the lock mechanism) 60 which is installed to the upper rail 40. The lock spring 60 is a bilaterally-symmetrical member formed by bending a single metal wire material. The lock spring 60 is provided, on a portion of each of the left and right sides thereof at positions slightly rearward from a central portion of the lock spring 60 with respect to the longitudinal direction thereof, with a pair of front and rear locking portions (lock mechanism) 61A and 61B (the lock spring 60 is provided with a total of four locking portions 61A and 61B) which extend outwardly and substantially horizontally. The portion of the lock spring 60 which is positioned forward from the front locking portions 61A and the portion of the lock spring 60 which is positioned rearward from the rear locking portions 61B are substantially horizontal in a free state. The lock spring 60 is provided at the front end thereof with a pair of left and right front-end locking lugs 62 which extend outwardly in a substantially horizontal direction. The lock spring 60 is further provided at the rear end thereof with a rear-end lock-engaging portion (supported portion/widthwise shaft) 63 which extends in the leftward and rightward directions (widthwise direction) in a plan view.

The lock release lever 50 is almost entirely accommodated in the upper rail 40 from the front end opening thereof, and the rotational contact protrusion 53 is in contact with the top wall 41B of the base 41 of the upper rail 40. On the other hand, space (clearance) is formed between the top surface of the lock release lever 50, except the rotational contact protrusion 53 thereof, and the top wall 41B of the base 41 of the upper rail 40.

The lock spring 60 is supported by the upper rail 40 and the lock release lever 50 in a manner which will be discussed hereinafter. The rear-end lock-engaging portion 63 of the lock spring 60 is inserted, from above, into the aforementioned downwardly-recessed spring support grooves (not shown) of the left and right rear lock-engaging lugs 45 of the upper rail 40, the portion of the lock spring 60 which is positioned forward from the locking portions 61A and 61B on both the left and right sides of the lock spring 60 are brought into lock-engagement with the aforementioned pair of (left and right) front lock-engaging lugs (not shown) of the upper rail 40, the locking portions 61A and 61B on both the left and right sides of the lock spring 60 are brought into engagement with the corresponding forward-rearward movement restriction grooves 43A and 43B of the upper rail 40 from below, the left and right front-end locking lugs 62 of the lock spring 60 are brought into lock-engagement with the spring-hook grooves 55 of the lock release lever 50 from below, and the left and right spring pressing lugs 54 of the lock release lever 50 are brought to abut against upper surfaces of the left and right front locking portions 61A of the lock spring 60. In a locked state, the front locking portions 61A and the rear locking portions 61B of the lock spring 60 are engaged in the forward-rearward movement restriction grooves 43A and the forward-rearward movement restriction grooves 43B, respectively, and further engaged in the lock grooves 34B of the lower rail 30. The front locking portions 61A and the rear locking portions 61B of the lock spring 60 partly extend through the lock grooves 34B of the lower rail 30 and the forward-rearward movement restriction grooves 43A and 43B of the upper rail 40 to project into the inside of the base 41 of the upper rail 40 (into the space between the pair or side walls 41A).

The lock spring 60 installed to the upper rail 40 and the lock release lever 50 in the above described manner is resiliently deformed to produce an upward biasing force (resiliency). This biasing force causes the rotational contact protrusion 53 of the lock release lever 50 to be pressed against the top wall 41B of the base 41 of the upper rail 40, which enables the lock release lever 50 to rotate about the rotational contact protrusion 53 with the contact portion between the top wall 41B and the rotational contact protrusion 53 as a rotation center, and the lock release lever 50 is held in the locked position when no downward external force is exerted on the portion of the lock release lever 50 which is positioned rearward from the rotational contact protrusion 53, which is formed on a top surface of the lock release lever 50. When the lock release lever 50 is in the locked position, the locking portions 61A and 61B of each of the left and right sides of the lock spring 60 are engaged in the lock grooves 34B of the associated inner wall 31D of the lower rail 30. Additionally, a component force of the biasing force produced by the resilient deformation of the lock spring 60 acts as a biasing force which biases a portion of the lock spring 60 in the vicinity of the rear-end lock-engaging portion 63 downward, so that this component force biases and moves the rear-end lock-engaging portion 63 toward the lower ends of the spring support grooves (not shown) of the pair of rear lock-engaging lugs 45.

On the other hand, exerting a downward external force on the portion of the lock release lever 50 which is positioned rearward from the rotational contact protrusion 53, which is formed on a top surface of the lock release lever 50, against the biasing force of the lock spring 60 causes the lock release lever 50 to rotate to the unlocked position about the contact portion between the top wall 41B and the rotational contact protrusion 53. Thereupon, the pair of spring pressing lugs 54 of the lock release lever 50 depresses the lock spring 60, which causes the lock spring 60 to be resiliently deformed downwardly with the rear-end lock-engaging portion 63, which is supported by the pair of rear lock-engaging lugs 45 of the upper rail 40, and the portion of the lock spring 60 which is supported by the aforementioned pair of front lock-engaging lugs (not shown) of the upper rail 40 as support points, thereby causing the locking portions 61A and 61B of each of the left and right sides of the lock spring 60 to be disengaged downward from the lock grooves 34B of the associated inner wall 31D of the lower rail 30.

When the lower rail 30, the upper rail 40, the lock release lever 50 and the lock spring 60 are assembled by inserting the upper rail 40, the lock release lever 50 and the lock spring 60 which are combined as a unit into the inside of the lower rail 30 from the front end opening or the rear end opening thereof, the upright walls 42 and the lock walls 43 of the rail unit 40 enter the spaces formed between the outer walls 31B and the inner walls 31D of the lower rail 30, and bearing balls 72 that are rotatably supported by retainers 70 installed in these spaces come in rotatable contact with the outer surfaces of the upright walls 42 and the inner surfaces of the outer walls 31B. At the same time, bearing balls 74 that are rotatably supported by the retainers 70 are rotatably supported in the spaces (corner portions) each formed between the boundary portion between the bottom wall 31A and one outer wall 31B of the lower rail 30 and the boundary portion between the base 41 and the associated upright wall 42 (or the associated lock wall 43) of the lower rail 40. This makes it possible for the upper rail 40 (a combination of the upper rail 40, the lock release lever 50 and the lock spring 60) to slide in the forward and rearward directions with respect to the lower rail 30, specifically makes it possible for the upper rail 40 (a combination of the upper rail 40, the lock release lever 50 and the lock spring 60) to slide in the range of movement between the front end position at which the left and right stopper walls 44 come in contact with the front-end stoppers 35A and the rear end position at which the left and right stopper walls 44 come in contact with the rear-end stoppers 35B. The lower rail 30 is provided, at positions on imaginary extensions of the retainers 70 in the forward and rearward directions, with lanced lugs (not shown) which restrict the sliding movements of the retainers 70 and the bearing balls 72 in the forward and rearward directions relative to the lower rail 30.

The rail unit 20 is provided with a lock member support bracket 80 which is fixed to the upper rail 40. The lock member support bracket 80 is provided with a base 81 in the shape of a flat plate which is substantially identical in dimension to the top wall 41B of the base 41 and is mounted on the top surface of the top wall 41B. The base 81 of the lock member support bracket 80 is provided, at three positions corresponding to the positions of the three bolt insertion holes 46A of the upper rail 40, with three bolt insertion holes (through-holes) 82 and is further provided, at a position corresponding to the position of the lock-lug insertion hole 47, with a lock-lug insertion hole (through-hole) 83 which is substantially identical in shape and size to the lock-lug insertion hole 47 in a plan view. The lock member support bracket 80 is provided, at a central portion of the right edge of the base 81 in the forward and rearward directions, with a lock member support wall 84 which stands upright, extending in the upward direction. A rotation support hole 85 is formed through the lock member support wall 84.

The rail unit 20 is provided with a lock member 90 which is rotatably supported by the lock member support wall 84 of the lock member support bracket 80. The lock member 90 is provided at a central portion thereof with a rotation support hole 91 and further provided, at one end and the other end on the opposite sides of the rotation support hole 91 in the direction of the length of the lock member 90, with a pressing lock lug 92 and a wire holding lug 93, respectively. The lock member 90 is supported on a rotation support shaft 95 which is inserted into the rotation support holes 85 and 91 with the rotation support holes 85 and 91 aligned, a torsion spring 90 is fitted, at the coil portion thereof, onto the rotational support shaft 95 with one end and the other end of the torsion spring 90 respectively engaged with the lock member 90 and the lock member support bracket 80, and the lock member 90 is supported by the lock member support wall 84 to be rotatable about the rotation support shaft 95 while receiving the biasing force of the torsion spring 94 in the clockwise direction as viewed from the left side. The lock member 90 is provided in the wire holding lug 93 with a wire holding hole 93A with which one end of a wire rope (not shown) is fixedly engaged, and pulling the other end of this wire rope with a wire rope pulling mechanism (not shown) causes the lock member 90 to rotate in the counterclockwise direction as viewed from the left side against the biasing force of the torsion spring 94.

The pressing lock lug 92 of the lock member 90 is inserted into the lock-lug insertion hole 83 of the lock member support bracket 80 and the lock-lug insertion hole 47 of the upper rail 40 to be positioned immediately above a rear portion of the rotational contact protrusion 53, which is formed on a top surface of the lock release lever 50, to be capable of coming into and out of contact with the rear portion of the rotational contact protrusion 53. In a state where the lock member 90 receives the clockwise biasing force from the torsion spring 94 without being pulled via the wire rope pulling mechanism (not shown), the pressing lock lug 92 of the lock member 90 does not press (is in noncontact with) the rear portion of the rotational contact protrusion 53, which is formed on a top surface of the lock release lever 50, so that the lock release lever 50 is held in the locked position. On the other hand, rotating the lock member 90 in the counterclockwise direction against the biasing force of the torsion spring 94 by operating the wire rope pulling mechanism (not shown) causes the pressing lock lug 92 of the lock member 90 to depress the rear portion of the rotational contact protrusion 53, which is formed on a top surface of the lock release lever 50, to thereby rotate the lock release lever 50 to the unlocked position about the contact portion between the top wall 41B and the rotational contact protrusion 53.

In the slide rail device 10 that is constructed as described above, the lock release lever (lock control member) 50 changes the position thereof in the upward and downward directions by rotating between the locked position and the unlocked position in a state of being accommodated inside the base 41 (between the pair of side walls 41A). More specifically, the lock release lever 50 rotates from the locked position to the unlocked position by receiving a pressing force from the pressing lock lug 92 of the lock member 90 via the rear portion of the rotational contact protrusion 53, which is formed on a top surface of the lock release lever 50.

It is ideal that the aforementioned pressing force, which is exerted on the rear portion of the rotational contact protrusion 53 from the pressing lock lug 92 of the lock member 90, consist solely of a vector component in the upward and downward directions; however, in reality, the aforementioned pressing force also includes a vector component in the forward and rearward directions and a vector component in the leftward and rightward directions (widthwise direction). Specifically, if a force having a vector component in the leftward and rightward directions (widthwise direction) is transferred to the rear portion of the rotational contact protrusion 53, which is formed on a top surface of the lock release lever 50, there is a possibility of the lock release lever 50 rattling relative to the upper rail 40 in the leftward and rightward directions (widthwise direction) and thereby inducing problems such as malfunctioning and noise generation.

To prevent such problems from occurring, in the present embodiment of the slide rail device 10, the pair of anti-rattle projections 56, which project from the pair of side walls 51 toward the pair of side walls 41A of the upper rail 40, are formed on the lock release lever 50. This minimizes the clearance between the upper rail 40 and the lock release lever in the leftward and rightward directions (widthwise direction) to prevent the upper rail 40 and the lock release lever 50 from rattling relative to each other in the leftward and rightward direction (widthwise direction) and prevent problems such as malfunctioning and noise generation which may be caused by the rattling of the lock release lever 50 from occurring.

Additionally, in the present embodiment of the slide rail device 10, the pair of anti-rattle projections 56 are formed to project from the upper ends of the pair of side walls (facing walls) 51. More specifically, the pair of anti-rattle projections 56 consist of the pair of inclined lugs 56A, which extend obliquely upward and outward in directions away from each other from the upper front ends of the left and right side walls (facing walls) 51, and the pair of anti-rattle lugs 56B, which extend upward from the upper ends of the pair of inclined lugs 56A along the inner surfaces of the left and right side walls 41A of the base 41 as described above. This makes it possible to secure the insertability and rolling ability of the retainer 70, which contains the bearing balls 72 and 74, without loss of resilient deformation of the upper rail 40.

Additionally, in the present embodiment of the slide rail device 10, the pair of chamfered portions (inclined surface) 57, which face inner surfaces of the pair of side walls 41A of the upper rail 40, are formed at the upper ends of the pair of anti-rattle lugs 56B. This makes it possible to securely prevent sharp edges of the pair of anti-rattle lugs 56B of the lock release lever 50 from contacting the pair of side walls 41A of the upper rail 40 and prevent noise (e.g., scraping or rubbing sound) which may be caused by contact of such sharp edges with the side walls 41A from occurring.

The slide rail device 10, in which the rear portion of the rotational contact protrusion 53 that is formed on a top surface of the lock release lever 50 is pressed by the pressing lock lug 92 of the lock member 90 to rotate the lock release lever 50 from the locked position to the unlocked position, has been illustrated above as an embodiment of a slide rail device for use in a vehicle according to the present invention. However, the structure for rotating the lock release lever 50 from the locked position to the unlocked position is not limited solely to this particular structure; for instance, a modified embodiment using a loop handle (not shown) which connects the lock release levers 50 of the pair of left and right rail units 20 is also possible. This loop handle is a tubular member made of metal which is formed by bending, and is connected to the front ends of the lock release levers 50 of the pair of left and right rail units 20 by inserting one end and the other end of the loop handle into the internal spaces of the front ends of the lock release levers 50 of the pair of left and right rail units 20 from front, respectively. Pulling the loop handle upward causes this pulling force that rotates the lock release lever 50 of each rail unit 20 from the locked position to the unlocked position to be transmitted from the loop handle to the lock release levers 50 via the front ends thereof that are respectively connected to one end and the other end of the loop handle.

In this modified embodiment that uses a loop handle, one end and the other end of the loop handle, which are connected to the front ends of the lock release levers 50 of the pair of rail units 20, change the positions thereof in the upward and downward directions (rotate (swing) in the upward and downward directions) in a state of being accommodated in between the pair of side walls 41A of the upper rail 40. In this case, not only the above described configuration in which each lock lever 50 is provided with the pair of anti-rattle projections 56 (the pair inclined lugs 56A and the pair of anti-rattle lugs 56B) but also a configuration in which the loop handle is provided at each of one end and the other end thereof with a pair of anti-rattle projections (a pair of inclined lugs and a pair of anti-rattle lugs) corresponding to the pair of anti-rattle projections 56 (the pair inclined lugs 56A and the pair of anti-rattle lugs 56B) are possible; moreover, a combination of the former and latter configurations is also possible. Accordingly, the term "lock control member" described herein is used to refer to the concept including both the lock release lever 50 and the above illustrated loop handle.

The slide rail device 10, in which the pair of anti-rattle projections 56 (the pair inclined lugs 56A and the pair of anti-rattle lugs 56B) are formed to project from the upper ends of the pair of side walls (facing walls) 51, has been illustrated above as an embodiment of a slide rail device for use in a vehicle according to the present invention. However, an embodiment in which the pair of anti-rattle projections 56 (the pair inclined lugs 56A and the pair of anti-rattle lugs 56B) of the lock release lever 50 are formed to project from the lower ends of the pair of side walls (facing walls) 51 is also possible.

Although the slide rail device 10, in which the pair of chamfered portions 57 that face inner surfaces of the pair of side walls 41A of the upper rail 40 are formed on the pair of anti-rattle lugs 56B, has been illustrated above as an embodiment of a slide rail device for use in a vehicle according to the present invention, it is possible to omit the formation of the chamfered portions 57.

Obvious changes may be made in the specific embodiment of the present invention described herein, such modifications being within the spirit and scope of the invention claimed. It is indicated that all matter contained herein is illustrative and does not limit the scope of the present invention.

What is claimed is:
1. A slide rail device for use in a vehicle, comprising:
a lower rail which is mounted to a vehicle floor and extends in forward and rearward directions;
an upper rail which is mounted to a vehicle seat and extends in said forward and rearward directions; and a lock mechanism which locks said upper rail to prevent said upper rail from moving in said forward and rearward directions relative to said lower rail and unlocks said upper rail to allow said upper rail to move in said forward and rearward directions relative to said lower rail, wherein said upper rail comprises a pair of side walls which are spaced from each other in a widthwise direction and extend in upward and downward directions, wherein said lock mechanism comprises a lock control member which is operated to change a position thereof in said upward and downward directions in a state of being accommodated in between said pair of side walls of said upper rail, and wherein said lock control member comprises:

a pair of facing walls which face said pair of side walls of said upper rail and extend in said upward and downward direction; and a pair of anti-rattle projections which project from said pair of facing walls toward said pair of side walls of said upper rail; wherein said pair of anti-rattle projections project from upper ends of said pair of facing walls.

2. The slide rail device according to claim 1, wherein said pair of anti-rattle projections comprise:

a pair of inclined lugs which extend obliquely upward in directions away from each other from said upper ends of said pair of facing walls toward said pair of side walls of said upper rail; and a pair of anti-rattle lugs which extend upward from ends of said pair of inclined lugs along inner surfaces of said pair of side walls of said upper rail.

3. The slide rail device according to claim 2, wherein said pair of anti-rattle lugs comprise a pair of chamfered portions which are formed at upper ends thereof to face inner surfaces of said pair of side walls of said upper rail.

4. The slide rail device according to claim 1, wherein said lock mechanism comprises:

a plurality of lock grooves which are formed on said lower rail and arranged in said forward and rearward directions;

a lock spring support portion which is formed on said upper rail; and a lock spring which includes: a lock portion capable of being engaged with and disengaged from said lock grooves; and a supported portion which is supported by said lock spring support portion, wherein said lock spring is biased in a direction to bring said lock portion into engagement with said lock grooves and is configured to be capable of bringing said lock portion into engagement with and disengagement from said lock grooves by moving said lock portion in upward and downward directions with said supported portion as a support point, wherein said lock control member of said lock mechanism comprises a lock release lever which is supported by said upper rail and capable of rotating between a locked position at which said lock release lever allows said lock portion of said lock spring to be engaged with said lock grooves and an unlocked position at which said lock release lever presses said lock spring in a direction to disengage said lock portion from said lock grooves.

* * * * *